United States Patent
Sugiyama et al.

(10) Patent No.: US 9,954,638 B2
(45) Date of Patent: Apr. 24, 2018

(54) OPTICAL MODULE AND OPTICAL TRANSMITTER USING THE SAME

(71) Applicant: Fujitsu Optical Components Limited, Kawasaki-shi, Kanagawa (JP)

(72) Inventors: Masaki Sugiyama, Kawasaki (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/134,622

(22) Filed: Apr. 21, 2016

(65) Prior Publication Data

US 2017/0033884 A1 Feb. 2, 2017

(30) Foreign Application Priority Data

Jul. 28, 2015 (JP) ................................. 2015-148663

(51) Int. Cl.
| H04J 14/06 | (2006.01) |
| H04B 10/532 | (2013.01) |
| H04B 10/2507 | (2013.01) |

(52) U.S. Cl.
CPC .......... *H04J 14/06* (2013.01); *H04B 10/2572* (2013.01); *H04B 10/532* (2013.01)

(58) Field of Classification Search
CPC ............................... H04B 10/532; H04J 14/06
See application file for complete search history.

(56) References Cited

U.S. PATENT DOCUMENTS

| 9,647,426 B1* | 5/2017 | Fish ...................... H01S 5/5018 |
| 2009/0060508 A1 | 3/2009 | Tanimura et al. |
| 2010/0067914 A1* | 3/2010 | Tanaka ............... H04B 10/5053 398/102 |
| 2011/0170869 A1* | 7/2011 | Mandai ................... H04J 14/06 398/65 |
| 2012/0050844 A1 | 3/2012 | Nishihara et al. |
| 2014/0119743 A1* | 5/2014 | Yang .................... H04B 10/293 398/175 |
| 2016/0261340 A1* | 9/2016 | Yang ................ H04B 10/07955 |
| 2016/0329967 A1* | 11/2016 | Yu .......................... G06F 1/2255 |

FOREIGN PATENT DOCUMENTS

| JP | 2009-60461 | 3/2009 |
| JP | 2011-188213 | 9/2011 |

OTHER PUBLICATIONS

Espacenet Bibliographic data, Publication No. 2011-188213, published Sep. 22, 2011.
Espacenet Bibliographic data, Publication No. 2009-60461, published Mar. 19, 2009.

* cited by examiner

*Primary Examiner* — Dzung Tran
(74) *Attorney, Agent, or Firm* — Staas & Halsey LLP

(57) ABSTRACT

An optical module has an optical modulator configured to perform phase modulation on each of divided light components of an input light and output at least two phase-modulated signal lights, a semiconductor optical amplifier configured to amplify the phased-modulated signal lights in a same polarization mode, and a polarization multiplexer configured to convert the amplified signal lights into two orthogonally polarized signal lights and multiplex the orthogonally polarized signal lights.

12 Claims, 13 Drawing Sheets

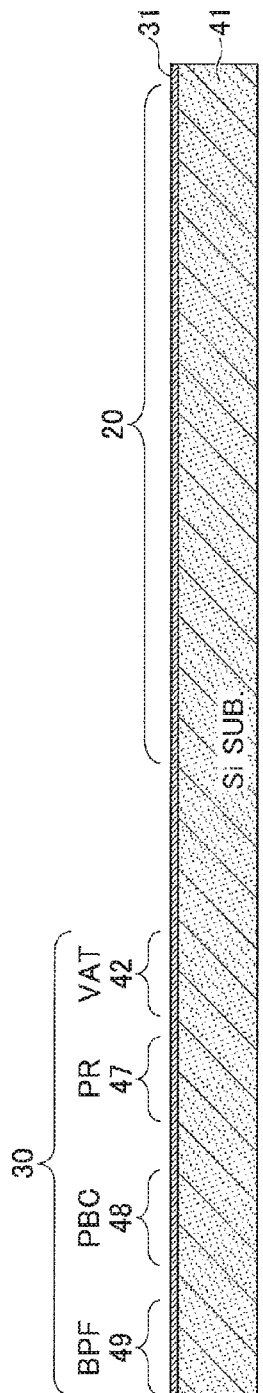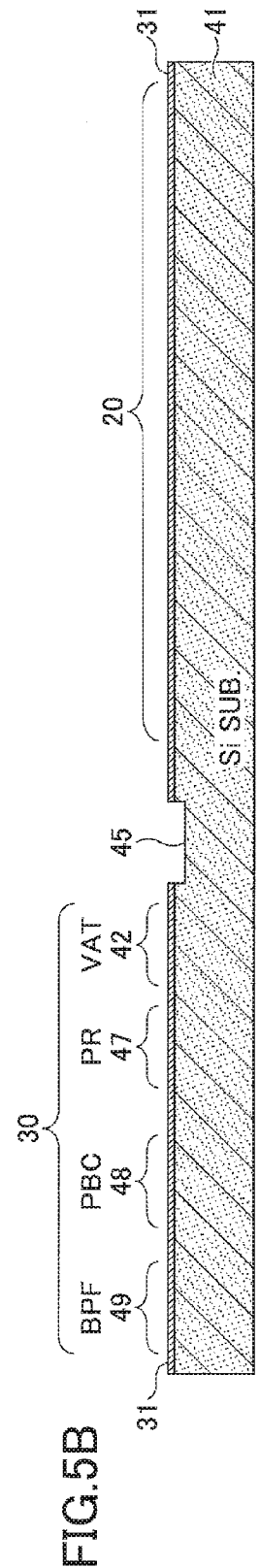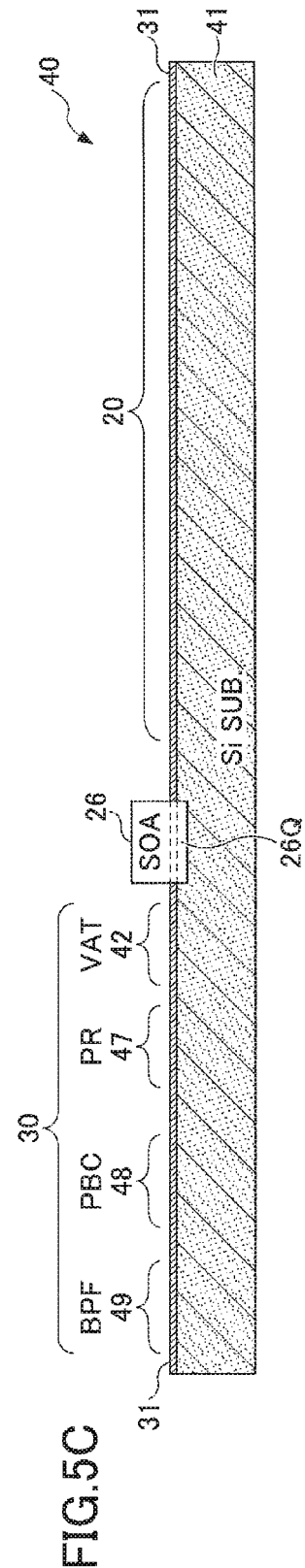

US 9,954,638 B2

OPTICAL MODULE AND OPTICAL TRANSMITTER USING THE SAME

CROSS-REFERENCE TO RELATED APPLICATIONS

The present application is based upon and claims the benefit of priority of the prior Japanese Patent Application No. 2015-148663 filed Jul. 28, 2015, the contents of which are incorporated herein by reference in its entirety.

FIELD

The disclosures herein relate to an optical module and an optical transmitter using the same.

BACKGROUND

In recent years, to achieve high data transmission capacity in fiber-optic transmission systems, research studies for increasing a modulation rate and improving modulation schemes (including multi-level modulation and polarization division multiplexing) are being made. With dual polarization quadrature phase-shift keying (DP-QPSK) using a digital coherent technique, long distance fiber-optic transmission at 100 GB/s has been achieved. Polarization division multiplexing (PDM) permits two independent data signals to be transmitted at a time by combining two orthogonally polarized light signals.

FIG. 1 illustrates a typical DP-QPSK modulator module 100. The modulator module 100 includes a modulator chip 120 with four Mach-Zehnder (MZ) interferometers 121-124 arranged in parallel, a polarization rotator (PR) 125, and a polarization beam combiner (PBC) 126. A light beam emitted from a light source 105 such as a laser diode (LD) is input to the modulator chip 120 via a lens 101. The input light is modulated under application of different electrical signals to the MZ interferometers 121-124. The direction of polarization of the light component output from one of the MZ interferometer pairs is rotated by 90 degrees at the PR 125 with respect to the light component output from the other pair of the MZ interferometers. These light components are combined at the PBC 126. The resultant signal is a multi-level modulated and polarization division multiplexed signal. The signal light output from the modulator module 100 is amplified by an erbium-doped fiber amplifier (EDFA) 127 and undergoes noise reduction at a bandpass filter (BPS) 128. Then, the signal is output to a transmission path.

With the configuration of FIG. 1, PDM and optical amplification are performed at separate components and therefore, the transmitter size becomes larger. To achieve a compact transmitter structure, the configuration of FIG. 2 may be provided in which the function of optical amplification is incorporated, together with the PR 125 and PBC 126 used for PDM, in a modulator module 200. In order to put the function of optical amplification into the modulator module 200, a semiconductor optical amplifier (SOA) 227 is used in place of the EDFA 127. The PBC 126, the SOA 227 and the BPF 228 are optically coupled using lenses 204 and 206.

The publications listed below are also known.
[Patent Document 1] Japanese Laid-open Patent Publication No. 2011-188213
[Patent Document 2] Japanese Laid-open Patent Publication No. 2009-60461

SUMMARY

According to an aspect of the embodiment, an optical module has
an optical modulator configured to perform phase modulation on each of divided light components of an input light and output at least two phase-modulated signal lights,
a semiconductor optical amplifier configured to amplify the phased-modulated signal lights in a same polarization mode, and
a polarization multiplexer configured to convert the amplified signal lights into two orthogonally polarized signal lights and multiplex the orthogonally polarized signal lights.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5A illustrates a fabrication process of the modulator chip illustrated in FIG. 4;
FIG. 5B illustrates a fabrication process of the modulator chip illustrated in FIG. 4;
FIG. 5C illustrates a fabrication process of the modulator chip illustrated in FIG. 4.

DESCRIPTION OF EMBODIMENTS

Figure 1:
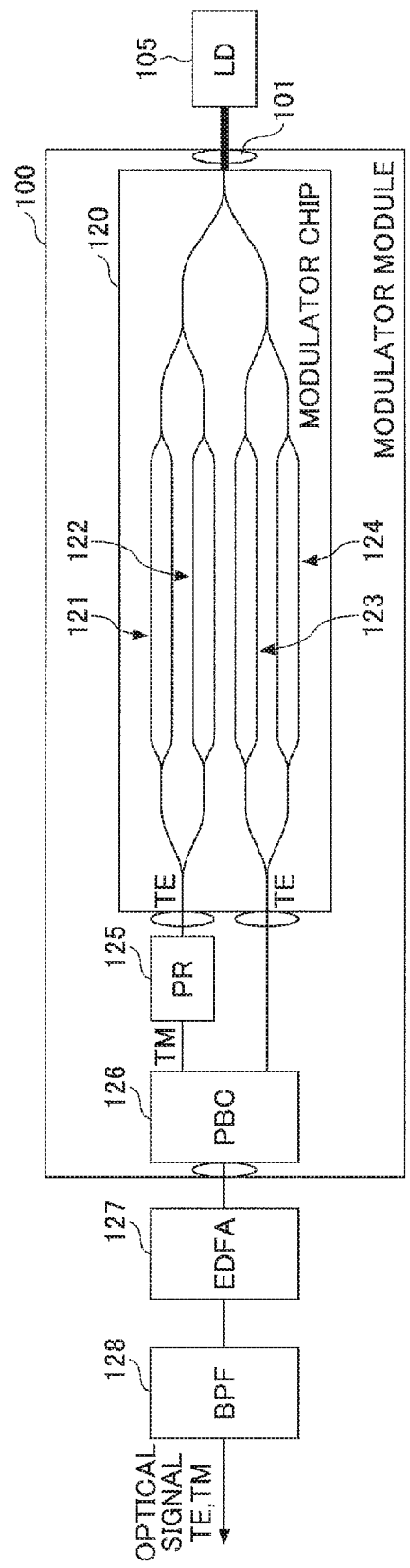
FIG. 1 is a schematic diagram of a typical modulator module.
Figure 2:
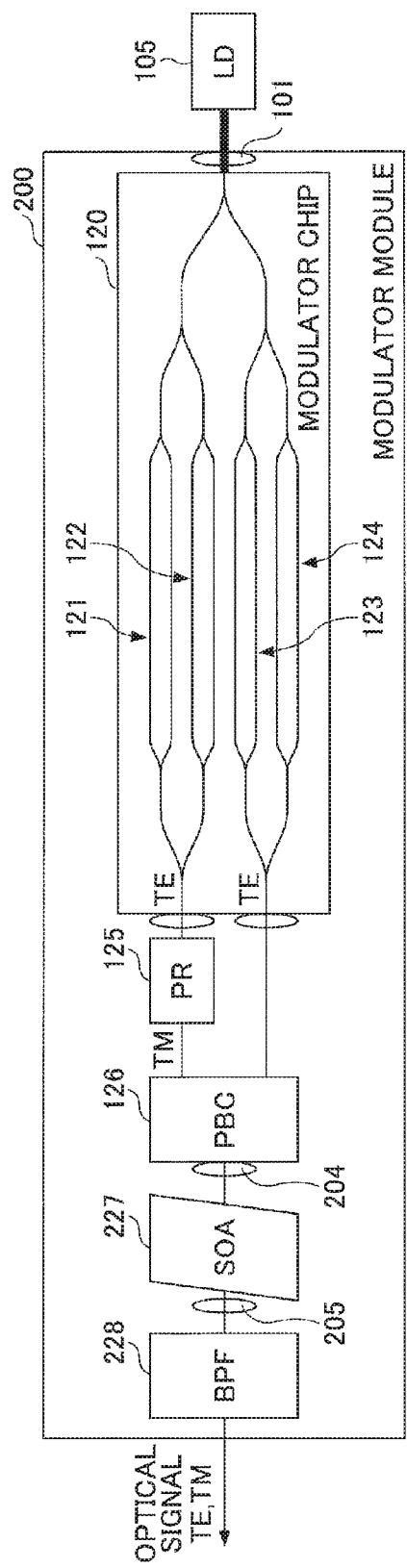
FIG. 2 is a schematic diagram of a modulator module in which an optical amplifier is incorporated.

The configuration illustrated in FIG. 2 has a problem in that the power levels of the output light differ between transverse electric (TE) polarized wave and transverse magnetic (TM) polarized wave because the gain of an SOA varies depending on the polarization mode.

In view of this technical problem, the embodiments provide a compact optical modulator with reduced polarization dependency. This can be achieved by inserting an SOA before a polarization rotator and amplifying signal lights in the same polarization mode (e.g., TE mode) and then performing polarization division multiplexing.

First Embodiment

Figure 3:
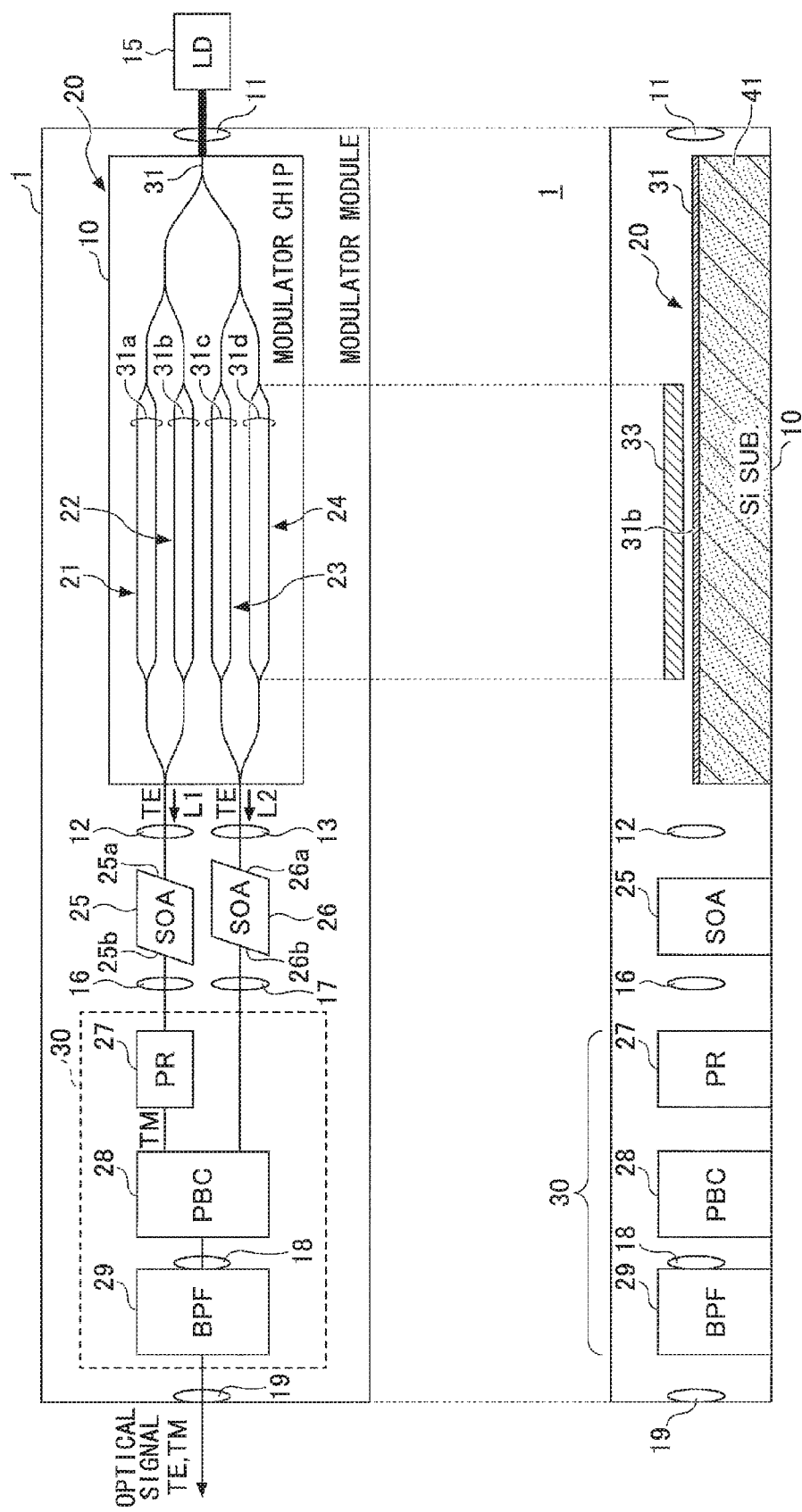
FIG. 3 is a schematic diagram of a modulator module according to the first embodiment.

FIG. 3 is a schematic diagram of a modulator module 1 according to the first embodiment. The modulator module 1 is one example of an optical modulator. The top figure of FIG. 3 is a top view and the bottom figure of FIG. 2 is a cross-sectional view along the light propagation direction. The modulator module 1 has a modulator chip 10, an SOA 25 and an SOA 26 which serve as an optical amplifier, and a polarization multiplexer 30. The SOAs 25 and 26 are arranged between the modulator chip 10 and the polarization multiplexer 30. In other words, the SOAs 25 and 26 are provided before a polarization rotator (hereinafter abbreviated as "PR") 27.

The modulator chip 10 is formed of a silicon substrate 41 and has four MZ interferometers 21-24 formed by parallel waveguide pairs 31a to 31d. In the first embodiment, the modulator chip 10 forms an optical modulator 20. A n/2 radian phase difference is added between light waves travelling through the MZ interferometers 21 and 22. Similarly, a n/2 radian phase difference is added between light waves travelling through the MZ interferometers 23 and 24. In the figure, phase shifters for applying the n/2 radian phase difference are omitted for the convenience of illustration. Electrodes 33 are provided to the parallel waveguide pairs 31a, 31b, 31c and 31d that form the MZ interferometers 21, 22, 23 and 24, respectively. The electrode 33 is, for example, a coplanar electrode including a signal electrode and a ground electrode.

In operations, a continuous wave output from an LD 15 is input to an optical waveguide 31 of the modulator chip 10 by a lens 11. The input light is in, for example, TE mode with its electric field parallel to the chip surface. The MZ interferometers 21 to 24 are driven by drive signals supplied externally. When driving the modulator chip 10 at a high rate, the ends of the signal electrode and the ground electrode are terminated by matched resistance to from a travelling-wave electrode and a microwave (electrical signal) is applied from the input side. In an electro-optic modulator using an electro-optic crystal such as lithium niobate (LN) or lithium tantalate (LT), the index of refractions of the parallel waveguide pairs 31a to 31d of the MZ interferometers 21-24 change due to the electric field of the applied electrical signals. In a semiconductor modulator, the carrier density of each of the parallel waveguide pairs 31a-31d changes due to the applied electric field and the light absorbance changes (electro-absorption effect). As a result, the signal light subjected to phase modulation between 0 radians and n radians is output at a high contrast by MZ interference.

A modulated light L1 produced by combining the light beams from the MZ interferometers 21 and 22 and a modulated light L2 produced by combining the light beams from the MZ interferometers 23 and 24 are output from the modulator chip 10. The modulated lights L1 and L2 are both in TE mode, and each of the modulated lights L1 and L2 contains an in-phase component and a quadrature component. The modulated light L1 is focused into the SOA 25 by a lens 12. The modulated light L2 is focused into the SOA 26 by a lens 13. The SOA 25 and the SOA 26 may have obliquely inclined input surfaces 25a and 26a and output surfaces 25b and 26b, respectively. The input surfaces 25a and 26a and the output surfaces 25b and 26b of the SOA 25 and 26 are not necessarily perpendicular to the light propagation axis. By using the input/output surfaces not completely perpendicular to the light propagation axis but with a certain degree of inclination, reflection is prevented and noise is reduced. The SOA 25 and the SOA 26 amplify the power levels of the input lights under injection of electric currents. Because the signal lights are amplified in the same polarization mode at the SOA 25 and the SOA 26, respectively, there are little variations in gain caused due to polarization difference even if the SOA 25 and the SOA 26 themselves have polarization dependent gain characteristics.

The signal lights output from the SOA 25 and the SOA 26 are input via the lens 15 and the lens 17, respectively, to the polarization multiplexer 30. The polarization multiplexer 30 has a PR 27, a polarization beam combiner (hereinafter abbreviated as "PBC") 28, and a bandpass filter (hereinafter abbreviated as "BPF") 29.

The PR 27 rotates the polarization axis of one of the amplified modulated lights L1 and L2 by 90 degrees. In the example of FIG. 3, the polarization axis of the light L1 output from the SOA 25 is rotated. Consequently, the polarization mode of the light L1 is converted to TM mode. On the other hand, the light L2 output from the SOA 26 remains in TE mode. By combining the TM polarized light L1 and the TE polarized light L2 at the PBC 28, signal lights with mutually orthogonal polarizations are multiplexed. The combined light output from the PBC 28 is focused into the BPF 29 by a lens 18 and noise is reduced. The output of the polarization multiplexer 30 is the output of the modulator module 1, and the signal light is output to an optical path such as an optical fiber through a lens 19.

With the configuration of FIG. 3, the modulator module 1 performs dual-polarization phase modulation and optical amplification in a compact structure, while reducing polarization dependency of SOA gain. The SOA 25 and the SOA 26 provided to the respective channels (for signal lights L1 and L2) can be independently controlled. Even if polarization dependency may be produced due to difference in optical loss among the optical modulator 20, the PR 27 and the PBC 28, such polarization dependency can be corrected. The PR 27 is of an arbitrary type including an liquid crystal PR, a half-wave plate, a combination of liquid crystal and a quarter-wave plate, a fiber optic polarizer, and so on.

The polarization multiplexer 30 may be formed in a silicon chip. In this case, the SOA 25 and the SOA 26 may be optically coupled with the silicon waveguides on the polarization multiplexer 30 via spot size converters.

Second Embodiment

Figure 4:
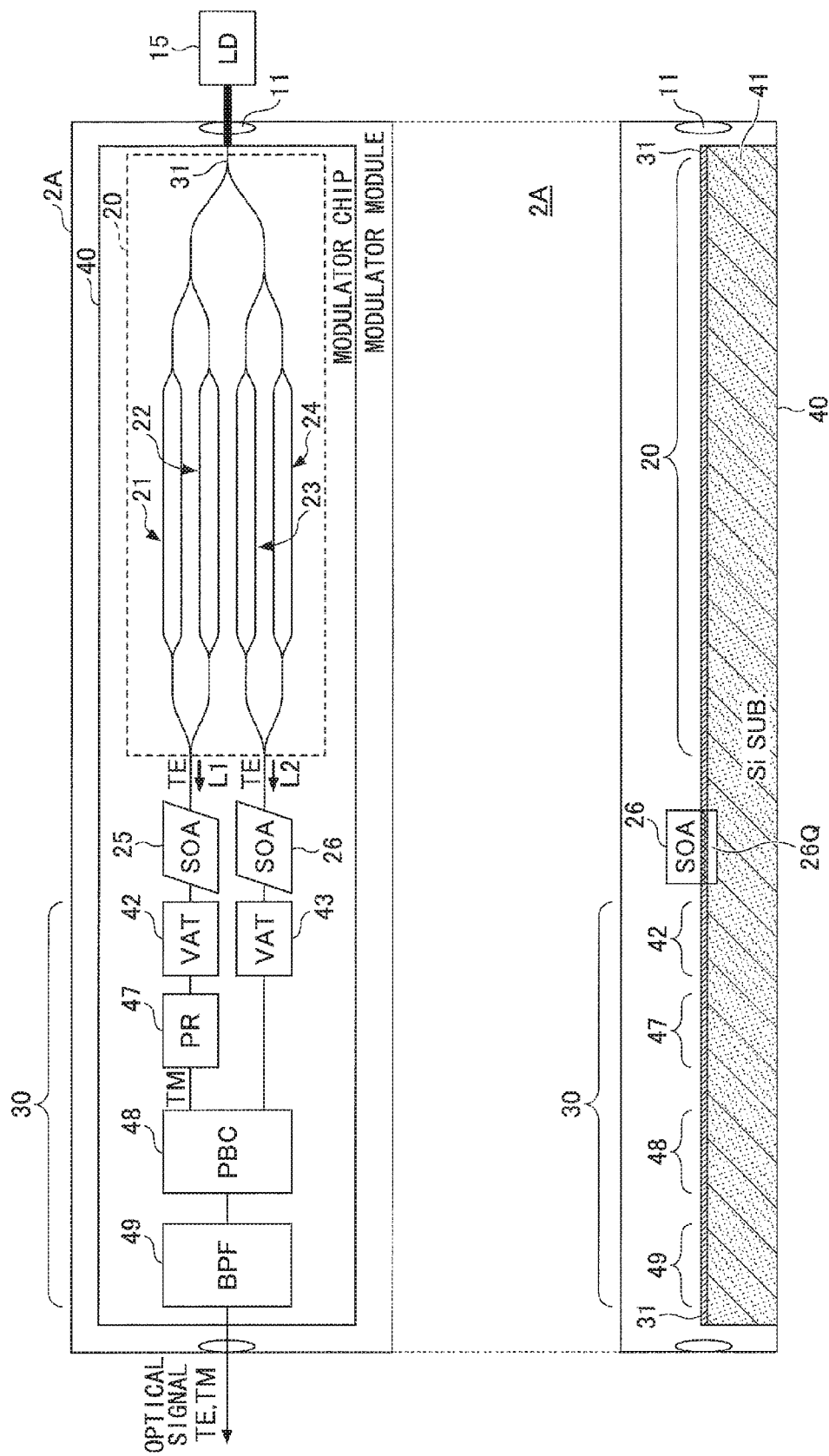
FIG. 4 is a schematic diagram of a modulator module according to the second embodiment.

FIG. 4 is a schematic diagram of a modulator module 2A which is one example of an optical modulator. In the first embodiment, separate optical components are arranged in the modulator module 1 and optically coupled using lenses. In the second embodiment, a modulator module 2A is formed of a single modulator chip 40. The modulator chip 40 has an optical modulator 20, an SOA 25 and an SOA 26 that serve as an optical amplifier, and a polarization multiplexer 30. The configuration of the optical modulator 20 is the same as that of the modulator chip 10 illustrated in FIG. 3 and four MZ interferometers 21-24 are arranged in parallel. The polarization multiplexer 30 has variable attenuators (VATs) 42 and 43 arranged at the input end, in addition to the PR 47, PBC 48 and BPF 49.

When forming the modulator chip 40 using the silicon substrate 41, the material of the SOA 25 and the SOA 26 may be different from that of the modulator chip 40. The SOA 25 and the SOA 26 are generally formed of a material other than silicon, such as a compound semiconductor or an organic material. When different materials are used between the modulator chip 40 and the SOAs 25 and 26, the SOA 25 and the SOA 26 fabricated separately from the modulator chip 40 are embedded in the substrate (i.e., the silicon substrate 41 in FIG. 4) of the modulator chip 40. The active layers 25Q and 26Q of the SOA 25 and SOA 26 (only the active layer 25Q is illustrated in the cross-sectional view of FIG. 4) are aligned and optically coupled with the silicon waveguides extending from the optical modulator 20 and the silicon waveguides of the polarization multiplexer 30.

FIG. 5A through FIG. 5C illustrate a fabrication process of the modulator chip 40. In FIG. 5A, optical waveguides 31 including the MZ interferometers 21-24, the VATs 42 and 43, the PR 47, the PBC 48 and the BPF 49 are formed on the silicon substrate 41. The optical waveguides 31 may be of a rib type or a silicon photonic nanowire. The PR 47 is formed by processing the core of a corresponding portion of the optical waveguide 31 into a shape with refractive index anisotropy with respect to the propagating light wave.

In FIG. 5B, a recess 45 for accommodating the SOA 25 and the SOA 26 is formed in the silicon substrate 41 by etching or cutting. In FIG. 5C, the SOAs 25 and 26 are placed in the recess 45 and bonded. The silicon cores of the optical waveguides 31 formed in the silicon substrate 41 are optically coupled with the active layers 25Q and 26Q of the SOA 25 and the SOA 26 at aligned positions. Spot size converters may be formed in the optical waveguides 31 at positions facing the input planes and the output planes of the SOA 25 and the SOA 26.

With this configuration, the modulator module 2A can be downsized. The SOA 25 and the SOA 26 are arranged before the PR 47. The modulated lights L1 and L2 output from the optical modulator 20 in the same polarization mode (e.g., TE mode) are amplified at the SOA 25 and the SOA 26, respectively, and then polarization division multiplexing is performed on the two signal lights. Influence from polarization dependency of the SOA 25 and the SOA 26 can be avoided. The VAT 42 and the VAT 43 are formed in the modulator chip 40 by silicon photonics technology. Polarization dependent loss that may be produced due to difference in optical loss among the optical modulator 20, the PR 47 and the PBC 48 can be corrected by the VAT 42 and the VAT 43, and the input power or injected current for the SOA 25 and the SOA 26 can be made constant.

Figure 6:
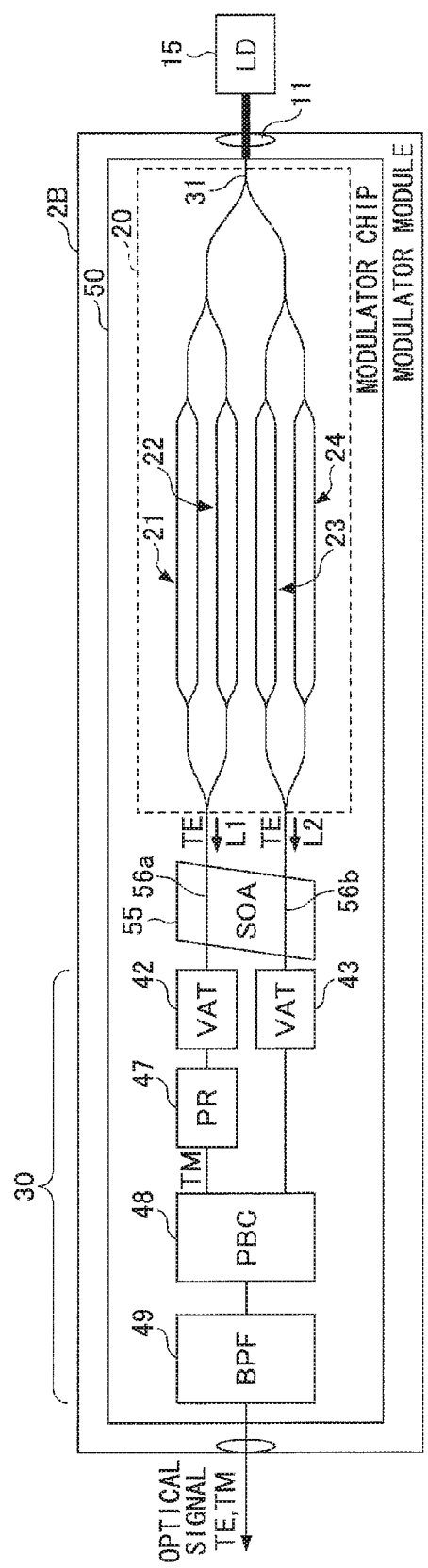
FIG. 6 is a modification of the modulator module illustrated in FIG. 4.

FIG. 6 illustrates a modulator module 2B, which is a modification of the modulator module 2A. In the modulator module 2B, an SOA 55 with two channels in a single chip is embedded in the modulator chip 50. A recess (see FIG. 5B) formed in the substrate of the modulator chip 50 accommodates a single chip SOA. The SOA 55 has two active layers (waveguides) 56a and 56b that are independent from each other. Each of the active layers 56a and 56b is optically connected to a corresponding one of the two optical waveguides 31 extending from the optical modulator 20. The light L1 travelling through one of the optical waveguides 31 is input to the active layer 56a and amplified. The light L2 travelling through the other optical waveguide 31 is input to the active layer 56b and amplified. This configuration is advantageous because the number of components or chips mounted in the modulator chip 50 is reduced and the assembling cost can be reduced. The modulator module 2B also has a downsizing effect and polarization dependency reduction effect as in the structure illustrated in FIG. 4.

The modulator chip 40 and the modulator chip 50 may be formed of a silicon-on-insulator (SOI) wafer, or alternately, an oxide layer may be formed on a silicon substrate 41. In the latter case, a silicon layer is epitaxially grown on the oxide layer and patterned into the optical waveguides 31.

Third Embodiment

Figure 7:
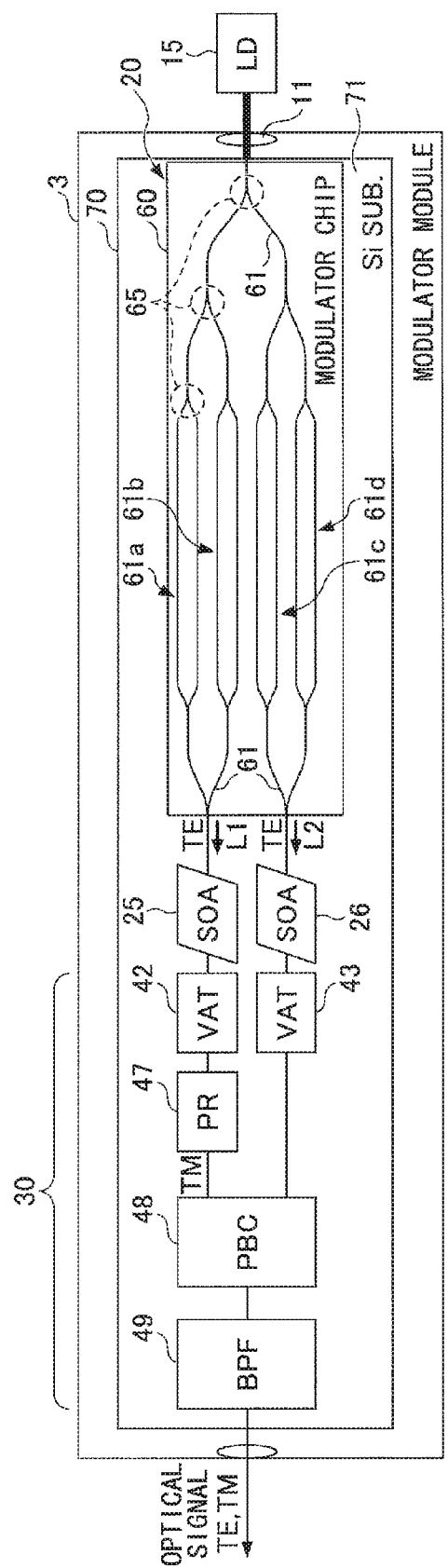
FIG. 7 is a schematic diagram of a modulator module according to the third embodiment.

FIG. 7 illustrates a modulator module 3 according to the third embodiment, which module is one example of an optical module. In the second embodiment, the optical modulator 20 and the polarization multiplexer 30 are formed of silicon and SOA(s) are amounted on the silicon platform. It may be difficult for a silicon modulator to achieve a wideband optical modulation scheme simultaneously with low loss and low drive voltage. Then, in the third embodiment, the optical modular is formed of a compound semiconductor. The modulator module 3 has a silicon chip 70. The silicon chip has a modulator chip 60 formed of a compound semiconductor and embedded in the silicon substrate 71, SOAs 25 and 26 embedded in the silicon substrate 71, and a polarization multiplexer 30 formed on the silicon substrate 71. The polarization multiplexer 30 includes a VAT 42, a VAT 43, a PR 47, a PBC 48, and a BPF 49 as in the second embodiment.

The modulator chip 60 forms an optical modulator 20. The modulator chip 60 has four MZ interferometers 61a through 61d arranged in parallel. The MZ interferometers 61a to 61d may be formed by optical waveguides 61 having a core of multilayer quantum well (MQW) of InGaAlAs surrounded by an InP clad layer, for example.

Signal light L1 produced by combining the light waves travelling through the MZ interferometers 61a and 61b is amplified by the SOA 25. Signal light L2 produced by combining the light waves travelling through the MZ interferometers 61c and 61d is amplified by the SOA 26. The configuration of the polarization multiplexer 30 arranged after the SOAs 25 and 26 in the light propagation direction is the same as those illustrated in FIG. 4 and FIG. 6. The power of the signal light L1 amplified at the SOA 25 is adjusted by the VAT 42. The polarization of the power-adjusted signal light L1 is rotated by 90 degrees at the PR 47 and converted into TM mode. The TM polarized signal light L1 and the TE polarized signal light L2 are multiplexed at the PBC 48, and noise is reduced at the BPF 49.

By mounting the modulator chip 60 made of a compound semiconductor on the silicon platform, wideband optical modulation can be achieved. Although in FIG. 7 the SOA 25 and the SOA 26 are embedded separately in the silicon substrate 71, the optical modulator 20 and the SOAs 25 and 26 may be formed monolithically on a single chip. In this case, the modulator module 3 is further downsized. The SOA 25 and the SOA 26 may be formed in a single chip with two independent channels as illustrated in FIG. 6.

Fourth Embodiment

Figure 8:
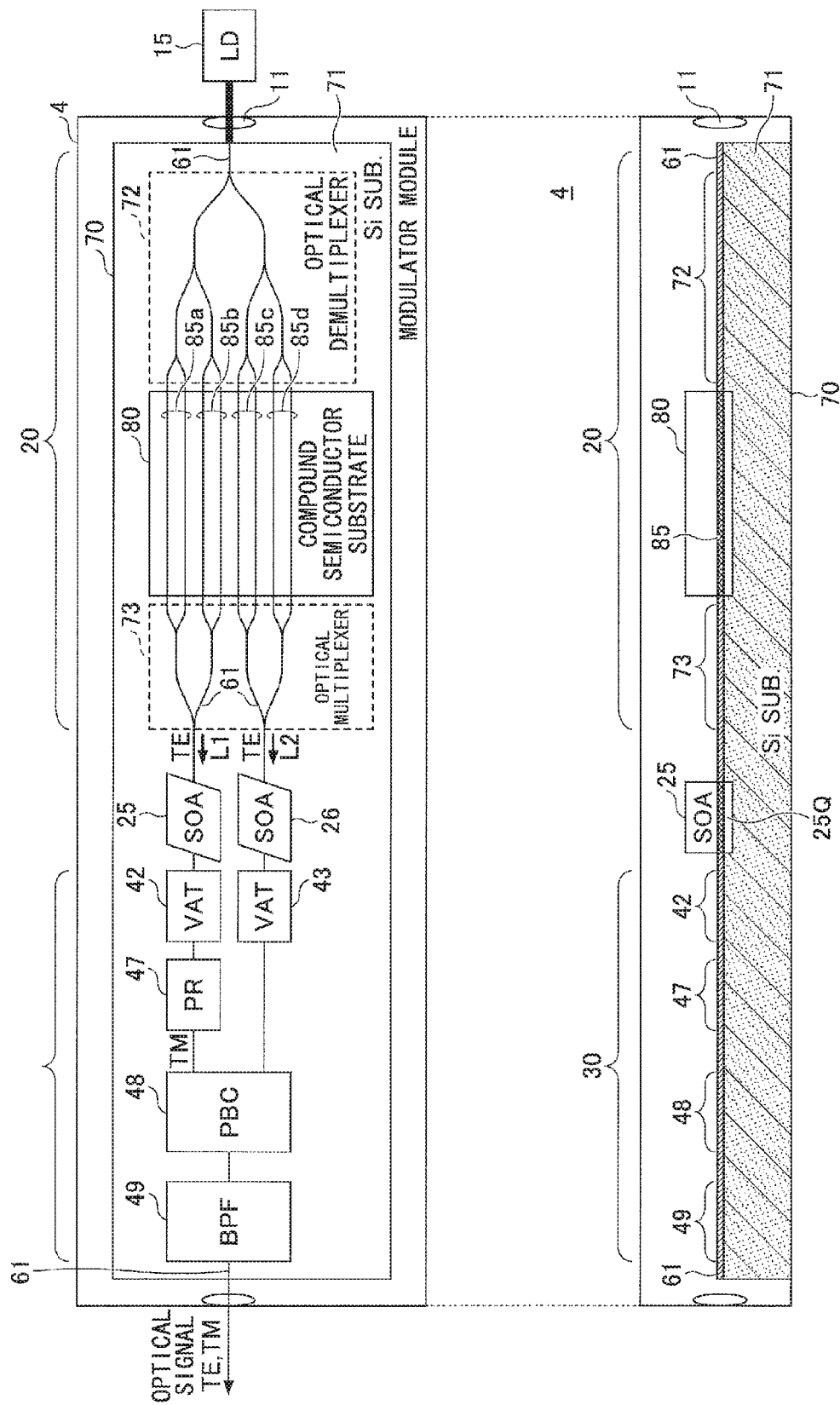
FIG. 8 is a schematic diagram of a modulator module according to the fourth embodiment.

FIG. 8 illustrates a modulator module 4 according to the fourth embodiment, which module is one example of an optical module. In the previous (third) embodiment, the modulator chip 60 is formed of a compound semiconductor. The modulation characteristic of the compound semiconductor modulator chip 60 is satisfactory. On the other hand, the light confinement effect of the optical waveguide 61 made of a compound semiconductor material is smaller compared with a silicon nanowire core. It is difficult for the compound semiconductor waveguide to reduce the bending radius at the branched portions 65 indicated by the dashed circles in FIG. 7 from the viewpoint of reducing bending loss. Then, in the fourth embodiment, cross-interaction part of the optical modulator 20 is formed of a compound semiconductor, while the branched portions (including combined portions) 65 are formed of silicon.

The modulator module 4 has a silicon chip 70. A compound semiconductor substrate 80 and the SOAs 25 and 26 are embedded in the silicon substrate 71 of the silicon chip 70. On the silicon substrate 71 are formed a branched part 72, a combined part 73 and a polarization multiplexer 30. The polarization multiplexer 30 includes a VAT 42, a VAT 43, a PR 47, a PBC 48, and a BPF 49 as in the second and third embodiments.

Four pairs 85a to 85d of parallel waveguides are formed on the compound semiconductor substrate 80. The parallel waveguide pairs 85a to 85d are formed by optical waveguides 85. The optical waveguides 85 are formed of a material with energy band gap smaller than the compound semiconductor substrate 80 and with refractive index greater than the compound semiconductor substrate 80. The parallel waveguide pairs 85a through 85d are optically coupled to the optical waveguide 61 formed in the branched part 72 of the silicon substrate 71 at the input side of the compound semiconductor substrate 80. The parallel waveguide pairs 85a through 85d are optically coupled to the optical waveguide 61 formed in the combined part 73 of the silicon substrate 71 at the output side of the compound semiconductor substrate 80. When coupled to the silicon waveguides 61 of the branched part 72 and the combined part 73, each of the parallel waveguide pairs 85a to 85d forms a MZ interferometer. The parallel waveguide pairs 85a to 85d modulate the optical phases of light beams travelling thought the parallel waveguides upon application of electrical signals (i.e., electric fields). In the sense that the electric field and light wave interact with each other, the parallel waveguide pairs 85a to 85d form a section that may be called a cross-interaction part.

The branched part 72, the four parallel waveguide pairs 85a to 85d (namely, the cross-interaction part) formed on the compound semiconductor substrate 80, and the combined part 73 form an optical modulator 20. This configuration can reduce polarization dependency with a compact module structure.

The signal lights L1 and L2 output in the same polarization mode (e.g., TE mode) from the combined part 73 undergo optical amplification at the SOAs 25 and 26 and attenuation adjustment at the VATs 42 and 43. Then one of the signal lights L1 and L2 is subjected to polarization rotation at the PR 47. The orthogonally polarized signal lights are multiplexed at the PBC 48.

Figure 9A:
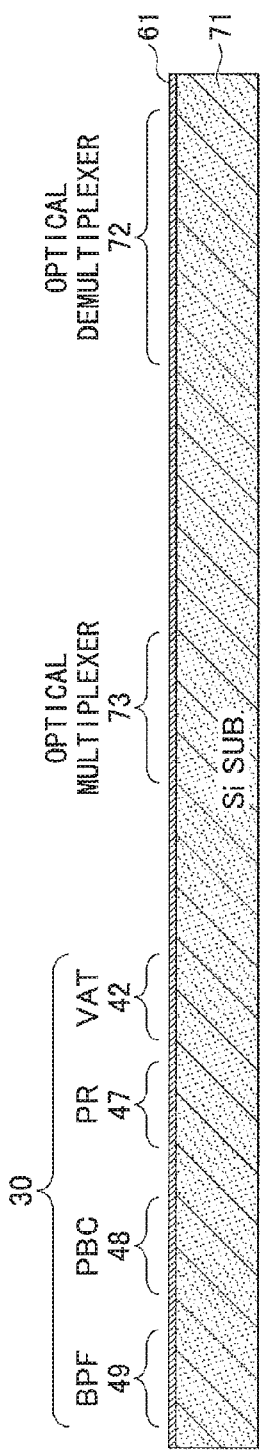
FIG. 9A illustrates a fabrication process of the modulator chip illustrated in FIG. 8
Figure 9B:
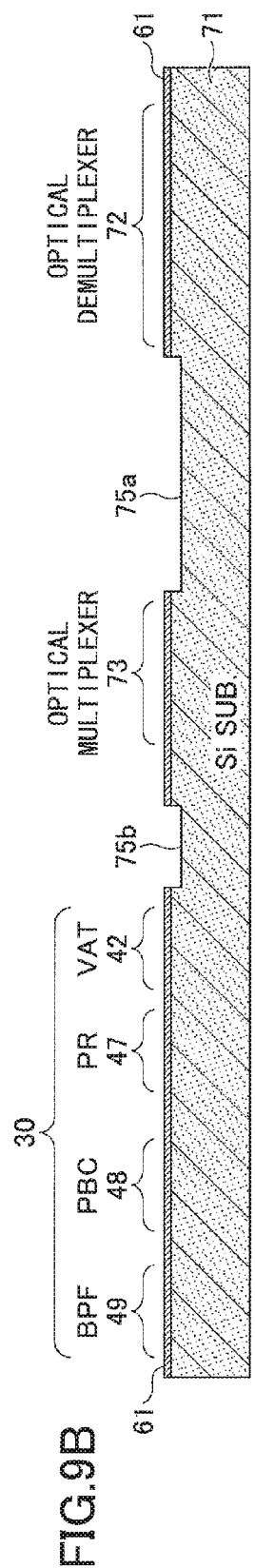
FIG. 9B illustrates a fabrication process of the modulator chip illustrated in FIG. 8.
Figure 9C:
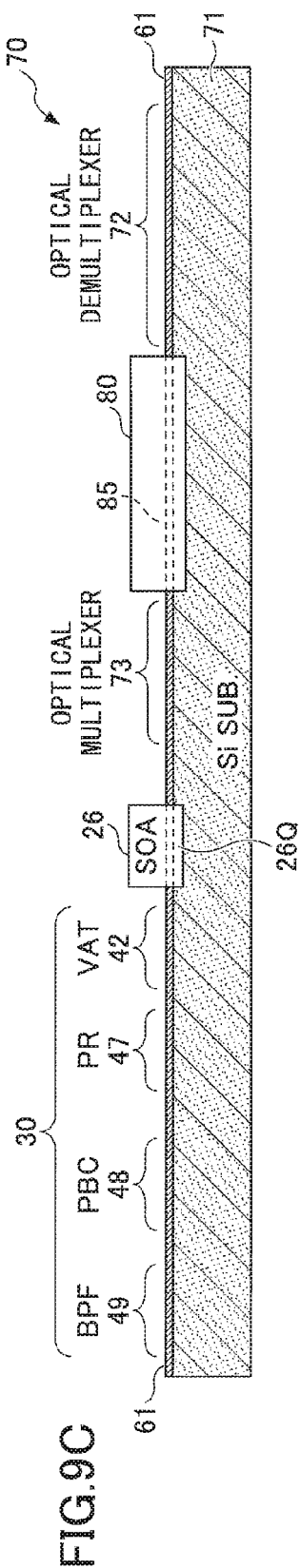
FIG. 9C illustrates a fabrication process of the modulator chip illustrated in FIG. 8.

FIG. 9A through FIG. 9C illustrate a fabrication process of the silicon chip 70 illustrated in FIG. 8. In FIG. 9A, optical waveguides 61 including the branched part 72, combined part 73, the VATs 42 and 43, the PR 47, the PBC 48 and the BPF 49 are formed on the silicon substrate 71. The optical waveguides 61 may be of a rib type or a silicon photonic nanowire.

In FIG. 9B, a recess 75a for accommodating the compound semiconductor substrate 80 and a recess 75b for accommodating the SOA 25 and the SOA 26 are formed in the silicon substrate 71 by etching or cutting. In FIG. 9C, the compound semiconductor substrate 80 on which the parallel waveguide pairs 85a to 85d are formed by optical waveguides 85 in advance is bonded to the recess 75a. The SOAs 25 and 26 are placed and bonded in the recess 75b. The cores of the parallel waveguide pairs 85a to 85d are aligned with the silicon cores of the optical waveguides 61 formed in the branched part 72 and the combined part 73. Spot size converters may be formed in the optical waveguides 61 at positions facing the input planes and the output planes of the SOA 25 and the SOA 26.

Fifth Embodiment

Figure 10:
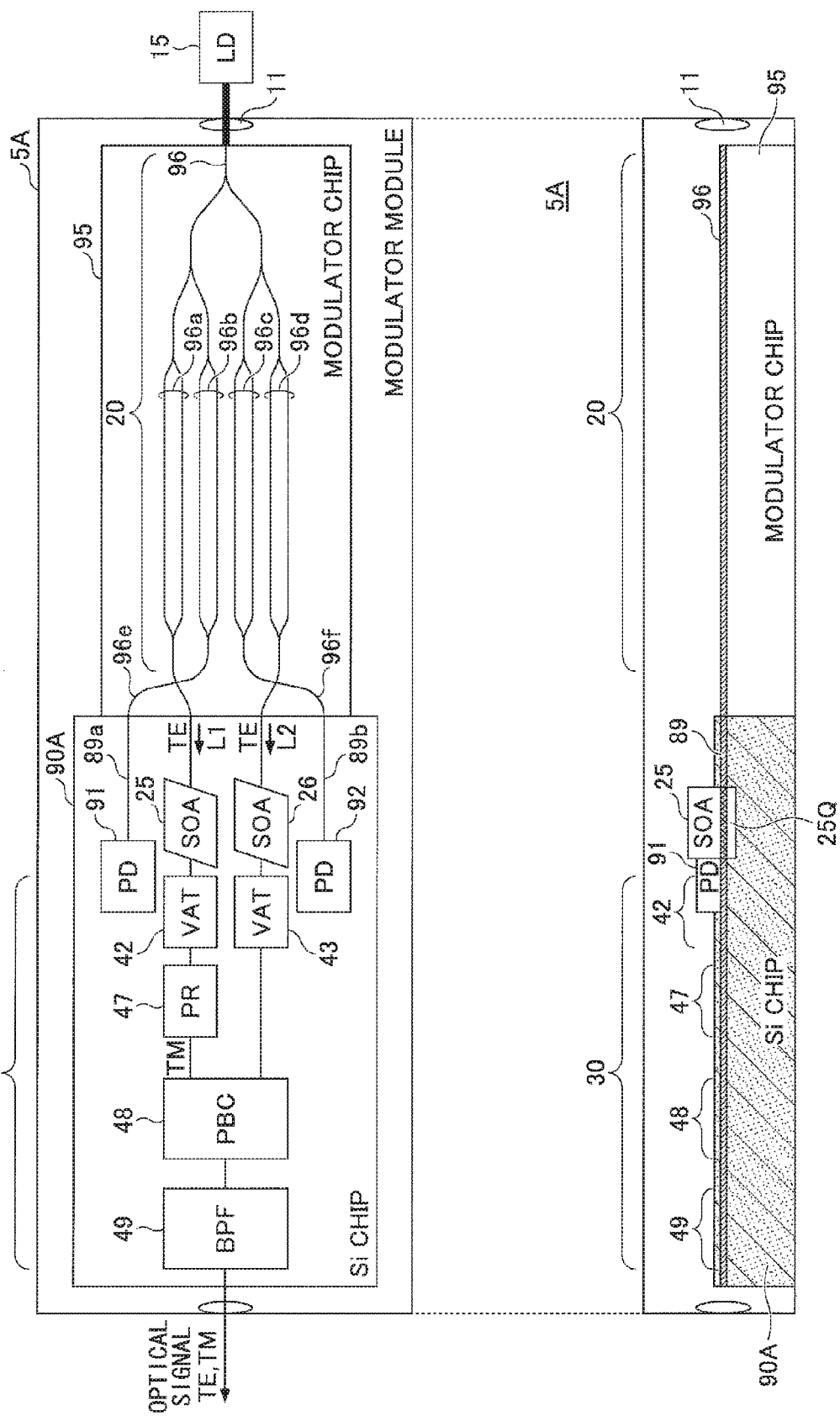
FIG. 10 is a schematic diagram of a modulator module according to the fifth embodiment.

FIG. 10 illustrates a modulator module 5A according to the fifth embodiment. In the fifth embodiment, a photodetector for monitoring modulated light is provided to the modulator module 5A. The modulator module 5A has a modulator chip 95 and a silicon chip 90A. An optical modulator 20 is formed in the modulator chip 95 by an arbitrary type of modulator, such as LN modulator, silicon (Si) modulator, or a compound semiconductor modulator. The silicon chip 90A performs both optical amplification and polarization division multiplexing.

A modulator that performs optical phase modulation may be structured so as to output a monitor light used for phase adjustment, in addition to the modulated signal light. In this embodiment, monitoring photo-detectors 91 and 92 are provided in the silicon chip 90A.

The optical waveguide 96 formed on the modulator chip 95 is branched to form four MZ interferometers (or four pairs of parallel waveguides) 96a through 96d. The combined light from the MZ interferometers 96a and 96b is input as a signal light L1 to the SOA 25 mounted on the silicon chip 90A. The combined light from the MZ interferometers 96c and 96d is input as a signal light L2 to the SOA 26 mounted on the silicon chip 90A. The SOA 25 and the SOA 26 are formed of a material different from that of the silicon chip 90A and embedded in the silicon chip 90A as has been explained in connection with FIG. 5 and FIG. 9. The signal lights L1 and L2 input to the SOA 25 and the SOA 26 are in the same polarization mode (e.g., in TE mode).

One of the two optical waveguides of a branch waveguide 96e extending from the combined part of the MZ interferometers 96a and 96b is optically coupled to an optical waveguide 89a formed in the silicon chip 90A. The monitor light is received at the PD 91 through the optical waveguide 89a. One of the two optical waveguides of a branch waveguide 96f extending from the combined part of the MZ interferometers 96c and 96d is optically coupled to an optical waveguide 89b formed in the silicon chip 90A. The monitor light is received at the PD 92 through the optical waveguide 89b. Based upon the monitoring results at the PD 91 and the PD 92, the quantities of phase adjustment at the SOA 25 and the SOA 26 are controlled so as to make the optical phases of the signal light L1 and the signal light L2 consistent with each other.

The VAT 42, VAT 43, PR 47, PBC 48 and BPF 49 arranged after the SOAs 25 and 26 are the same as those described in the second through fourth embodiments. At the PR 46, the direction of polarization of the amplified signal light L1 is rotated and converted into TM-mode signal light, while the amplified signal light L2 remains in the TE mode. The TM-mode signal light L1 and the TE-mode signal light L2 are multiplexed at the PBC 48.

With this configuration, a PD carrier used in a conventional structure is eliminated and a compact modulator module 5A is achieved. Besides, the optical phases of the orthogonally polarized waves can be made consistent with each other.

Figure 11:
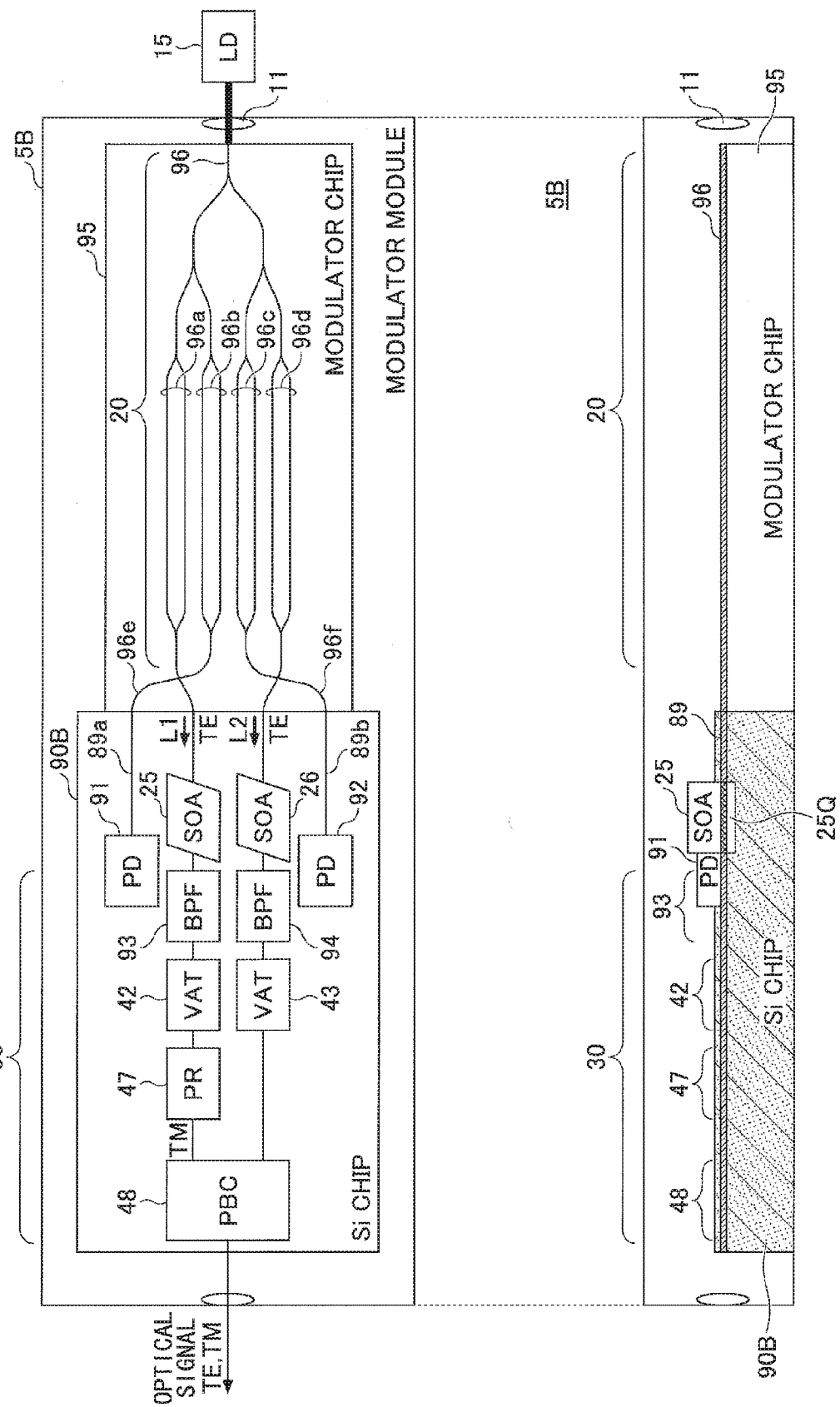
FIG. 11 is a modification of the modulator module of the fifth embodiment.

FIG. 11 illustrates a modulator module 5B, which is a modification of the modulator module 5A. The modulator module 5B has a modulator chip 95 and a silicon chip 90B in a module case. The modulator chip 95 is the same as that illustrated in FIG. 10. SOAs 25 and 26 are embedded in the silicon chip 90B and PD 91 and 92 are arranged on the silicon chip 90B.

The silicon chip 90B has BPFs 93 and 94 provided between the PR 47 and the SOAs 25 and 26. When a bandpass filter is formed by a diffraction grating, optical loss varies depending on polarization mode of the incident light. In the example of FIG. 11, the BPF 93 is inserted between the SOA 25 and the VAT 42, and the BPF 94 is inserted between the SOA 26 and the VAT 43. The signal lights L1 and L2 are amplified in the same polarization mode (e.g., TE mode) and noise is removed. Polarization rotation is performed on one of the amplified and noise-reduced signal lights L1 and L2 at the PR 47, and polarization division multiplexing is performed at the PBC 48.

This configuration can achieve a compact modulator module 5A with less influence of polarization dependency.

The modulator chip 95 used in the modulator module 5A (FIG. 10) and/or the modulator module 5B (FIG. 11) may have a structure illustrated in FIG. 8 with a cross-interaction part formed of a compound semiconductor substrate and branch and combined part formed of a silicon substrate.

Figure 12:
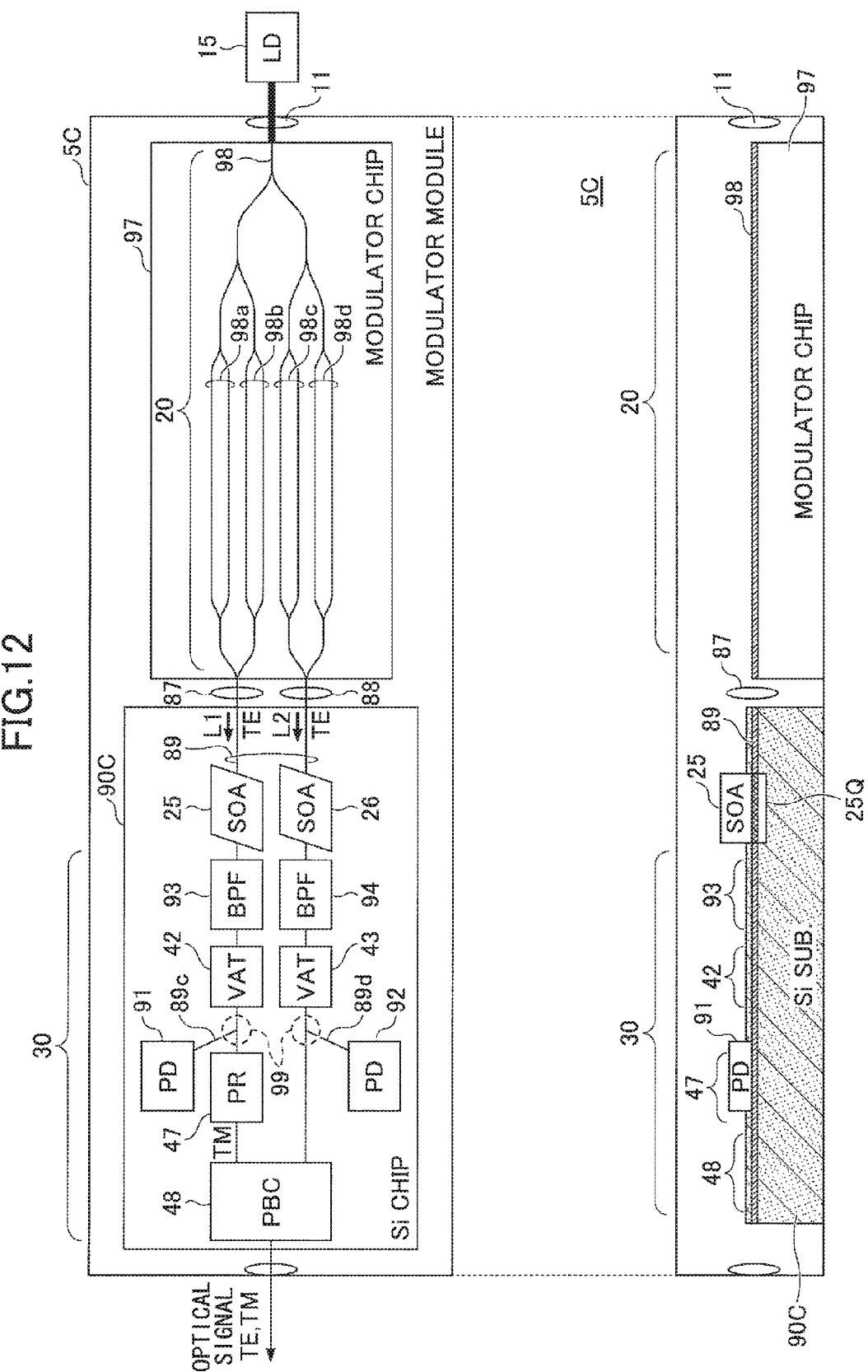
FIG. 12 is another modification of the modulator module of the fifth embodiment.

FIG. 12 illustrates a modulator module 5C, which is another modification of the modulator module 5A. The modulator module 5C has a modulator chip 97 and a silicon chip 90C. Similar to the structures in FIG. 10 and FIG. 11, the SOAs 25 and 26 and the PDs 91 and 92 are mounted on the silicon chip 90C. In FIG. 12, branch waveguides 89c and 89d for extracting monitor light are formed on the silicon chip 90C.

When individual difference in gain and/or loss is not negligible among the SOAs 25 and 26, the BPFs 93 and 94 and the VATs 42 and 43, a tap (or a branch) 99 is provided after the element with a large individual difference. Branched light components are received at the PD 91 and the PD 92 to monitor the power levels of the signal lights L1 and L2. In the example of FIG. 12, branch waveguides 89c and 89d are extended from the optical waveguides 89 after the VTA 42 and VTA 43 toward the PD 91 and PD 92, respectively. Because the branch waveguides 89c and 89d are formed in the silicon chip 90C, it is unnecessary to provide a branch waveguide in the modulator chip 97 for extracting monitor light. The modulator chip 97 has four parallel MZ interferometers 89a through 98d formed by optical waveguides 98 that are branched and combined at predetermined positions. For the modulator chip 97, the modulator chip 10 of the first embodiment (in FIG. 3) or the modulator chip 60 of the third embodiment (in FIG. 7) may be used.

Because the modulator chip 97 does not have monitoring branch waveguides, the modulated signal lights output from the modulator chip 97 can be incident onto the SOA 25 and the SOA 26 via a lens 87 and a lens 88, respectively. The modulated signal lights can be optically coupled directly to the SOA 25 and the SOA 26 without using silicon waveguides, and consequently insertion loss can be reduced.

The structural elements of the modulator modules of the first through fifth embodiments can be combined appropriately with each other. For example, in each of the embodiments, the cross-interaction part of the optical modulator 20 may be formed of a compound semiconductor as in the fourth embodiment. BPFs may be arranged before the PR 27 (or PR 48) in each of the embodiments to reduce noise in the same polarization mode prior to polarization rotation.

Figure 13:
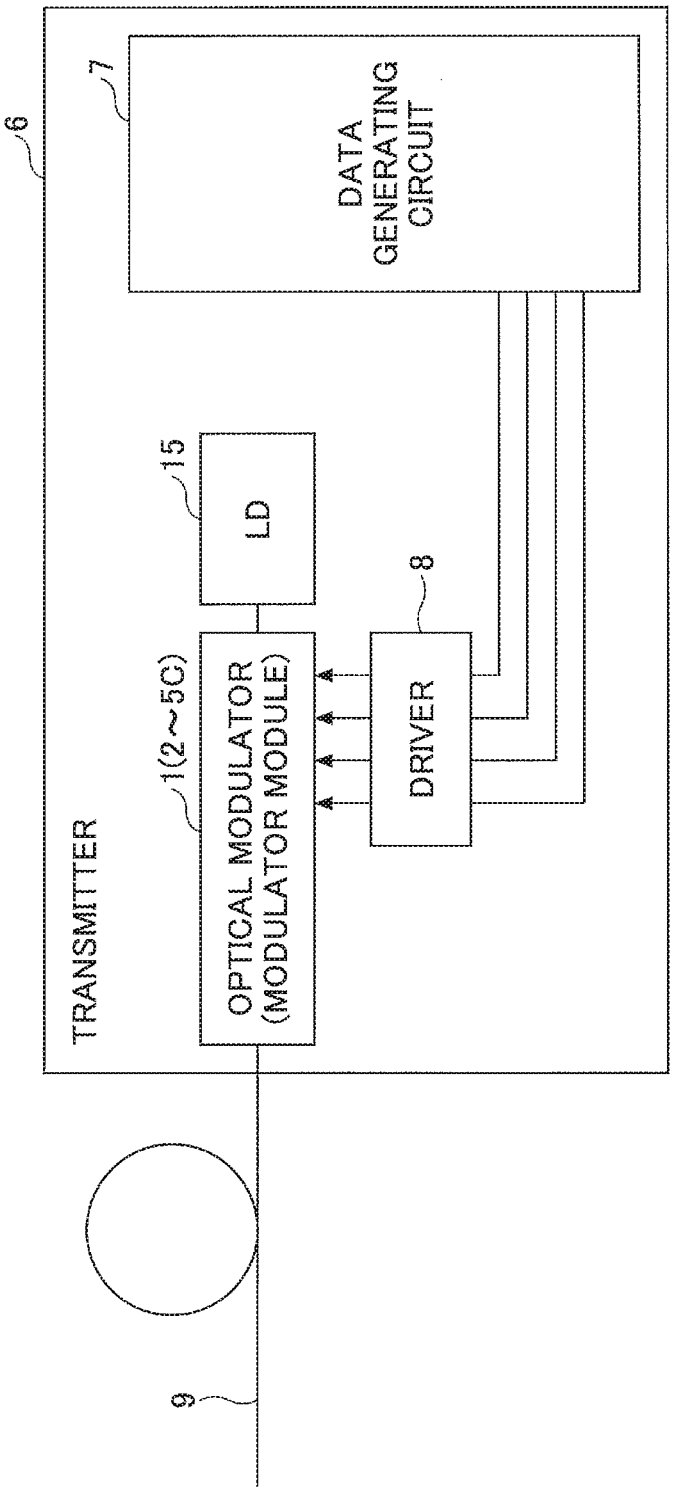
FIG. 13 is a schematic diagram of an optical transmitter using one of the modulator modules of the embodiments.

FIG. 13 illustrates an optical transmitter 6 that uses any one of the modulator modules 1 to 5C of the first through fifth embodiments. The optical transmitter 6 has a modulator module 1 (or any one of modulator modules 2 through 5C), a light source (such as an LD) 15, a data generating circuit 7 and a driver 8.

Electrical signals generated by the data generating circuit 7 are converted into high-speed drive signals by the driver 8 and applied to signal electrodes of the respective MZ interferometers of the optical modulator. From the view point of reducing the driving voltage, a pair of drive signals with opposite phases (or polarities) may be applied to each of the MZ interferometers. The light beam input from the light source 15 to the modulator module 1 is phase-modulated by the high-speed drive signals. The modulator module 1 (or any one of the modulator modules 2 through 5C) has abilities of optical modulation, optical amplification, and polarization division multiplexing. Phase-modulated two signal lights are amplified in the same polarization mode and then converted into orthogonally polarized signal lights for polarization division multiplexing. Thus, a DP-QPSK optical signal is output from the modulator module 1 (or any one of the modulator modules 2 through 5C) to a transmission path 9.

Any one of the modulator modules 1 to 5C has a compact structure and reduced polarization dependency. Accordingly, the optical transmitter 6 is made compact and can output optical signals modulated at the optimum modulation factor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical module comprising:
    an optical modulator configured to perform phase modulation on each of divided light components of an input light and output at least two phase-modulated signal lights;
    a semiconductor optical amplifier configured to amplify the phased-modulated signal lights in a same polarization mode; and
    a polarization multiplexer configured to convert the amplified signal lights into two orthogonally polarized signal lights and multiplex the orthogonally polarized signal lights,
    wherein the optical modulator includes multiple modulators, and the polarization multiplexer has a polarization rotator provided for said multiple modulators.

2. The optical module as claimed in claim 1, wherein the polarization rotator is positioned after the semiconductor amplifier in a direction of light propagation and configured to rotate a polarization axis of one of the amplified signal lights, and the polarization multiplexer further has a beam combiner configured to combine polarization-rotated signal light and other signal light with unrotated polarization.

3. The optical module as claimed in claim 2, wherein the polarization multiplexer has a variable attenuator positioned before the polarization rotator in the direction of light propagation.

4. The optical module as claimed in claim 1, wherein the semiconductor amplifier has an input surface inclined by a predetermined angle with respect to a plane perpendicular to a light propagation axis.

5. The optical module as claimed in claim 1, wherein the semiconductor amplifier is configured to amplify the phased-modulated signal lights independently.

6. The optical module as claimed in claim 1, wherein
the optical modulator and the polarization multiplexer are formed on a substrate of a first material, and
the optical amplifier is formed of a second material different from the first material and embedded in the substrate of the first material.

7. The optical module as claimed in claim 1, wherein
the polarization multiplexer is formed on a substrate of a first material, and
the optical modulator is formed of a second material different from the first material and embedded in the substrate of the first material.

8. The optical module as claimed in claim 1, wherein
the optical modulator has a branched part, a cross-interaction part, and a combined part, and
the cross-interaction part is formed of a first material, while the branched part and the combined part are formed of a second material with a bending loss smaller than that of the first material.

9. The optical module as claimed in claim 1, wherein the semiconductor optical amplifier and the polarization multiplexer are formed on a same substrate, and photodetectors are arranged on said same substrate to monitor the phase-modulated lights output from the optical modulator.

10. The optical module as claimed in claim 1, wherein the polarization multiplexer has a filter configured to remove noise from the multiplexed signal lights.

11. The optical module as claimed in claim 1, wherein the polarization multiplexer has a filter configured to remove noise from the amplified signal lights before the amplified signal lights are converted into the orthogonally polarized signal lights.

12. An optical transmitter comprising:
an optical module;
a light source configured to generate a light to be input to the optical module; and
a driver configured to drive the optical module,
wherein the optical module has
an optical modulator configured to perform phase modulation on each of divided light components of the input light and output at least two phase-modulated signal lights,
a semiconductor optical amplifier configured to amplify the phased-modulated signal lights in a same polarization mode, and
a polarization multiplexer configured to convert the amplified signal lights into two orthogonally polarized signal lights and multiplex the orthogonally polarized signal lights,
wherein the optical modulator includes multiple modulators, and the polarization multiplexer has a polarization rotator provided for said multiple modulators.

* * * * *